(12) United States Patent
Dirneder et al.

(10) Patent No.: US 11,141,894 B2
(45) Date of Patent: Oct. 12, 2021

(54) INJECTION UNIT FOR SHAPING MACHINE AND SHAPING MACHINE INCLUDING AN INJECTION UNIT

(71) Applicant: ENGEL AUSTRIA GmbH, Schwertberg (AT)

(72) Inventors: Franz Dirneder, Schwertberg (AT); Stephan Eppich, Arbing (AT); Robert Strasser, Langenstein (AT); Gerhard Hackl-Lehner, St. Thomas (AT); Christoph Balka, Schwertberg (AT); Friedrich Pernkopf, Gramastetten (AT); Gernot Boehm, Wartberg (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 17/146,943

(22) Filed: Jan. 12, 2021

(65) Prior Publication Data
US 2021/0221037 A1 Jul. 22, 2021

(30) Foreign Application Priority Data
Jan. 21, 2020 (AT) .............................. A 50040/2020

(51) Int. Cl.
*B29C 45/07* (2006.01)
*B29C 45/53* (2006.01)
(Continued)

(52) U.S. Cl.
CPC ........ *B29C 45/531* (2013.01); *B29C 45/1775* (2013.01); *B29C 45/54* (2013.01); *B29C 45/60* (2013.01)

(58) Field of Classification Search
CPC ....... B29C 45/12; B29C 45/20; B29C 45/322; B29C 2045/5615; B29C 2045/561
See application file for complete search history.

(56) References Cited

U.S. PATENT DOCUMENTS 3,169,275 A * 2/1965 Compton ................ B29C 45/50
425/548
3,833,204 A * 9/1974 Hehl ....................... B29C 45/83
425/107

(Continued)

FOREIGN PATENT DOCUMENTS

DE   10 2009 052 063   5/2010
EP       2 535 162     12/2012
JP       2009-255372   11/2009

*Primary Examiner* — Joseph S Del Sole
*Assistant Examiner* — Thu Khanh T Nguyen
(74) *Attorney, Agent, or Firm* — Wenderoth, Lind & Ponack, L.L.P.

(57) ABSTRACT

An injection unit for a shaping machine includes an injection element suitable for introducing a plasticized material into a mold tool by a linear movement of the injection element. The injection element is coupled in linear motion-transmitting relationship to a bearing element, and at least two linear drives are adapted to exert a force on the injection element by the bearing element. The force can be transmitted by a transmission element from the at least two linear drives to the bearing element and thus to the injection element, and at least one clearance is arranged between the bearing element and the transmission element such that deformations of the bearing element are not transmitted to the transmission element or are transmitted to a reduced degree.

23 Claims, 2 Drawing Sheets

(51) Int. Cl.
*B29C 45/17* (2006.01)
*B29C 45/54* (2006.01)
*B29C 45/60* (2006.01)

(56) References Cited

U.S. PATENT DOCUMENTS

| | | | | |
|---|---|---|---|---|
| 3,846,057 | A | * | 11/1974 | Counceller ............. B29C 45/18 |
| | | | | 425/207 |
| 3,945,786 | A | * | 3/1976 | Bishop ................ B29C 45/1634 |
| | | | | 425/208 |
| 6,494,701 | B2 | | 12/2002 | Eppich et al. |
| 7,955,068 | B2 | | 6/2011 | Kitta et al. |
| 2001/0038868 | A1 | | 11/2001 | Eppich et al. |
| 2010/0112120 | A1 | | 5/2010 | Kitta et al. |
| 2011/0177187 | A1 | * | 7/2011 | Nishimura ............ B29C 45/768 |
| | | | | 425/169 |
| 2021/0094211 | A1 | * | 4/2021 | Nanri ................. B29C 45/5008 |

* cited by examiner

INJECTION UNIT FOR SHAPING MACHINE AND SHAPING MACHINE INCLUDING AN INJECTION UNIT

BACKGROUND OF THE INVENTION

The present invention concerns an injection unit for a shaping machine and a shaping machine comprising such an injection unit.

The term shaping machines in that respect can be used to denote injection molding machines, injection presses, presses or the like. Hereinafter the state of the art is to be represented by means of an injection molding machine. A similar consideration applies to general shaping machines.

Injection units of the general kind set forth have an injection element suitable for introducing a plasticized material into a mold tool by a linear movement, wherein the injection element is coupled in linear motion-transmitting relationship to a bearing element and at least two linear drives are adapted to exert a force on the injection element by way of the bearing element.

Injection units are generally used to inject a plasticized material (for example a thermoplastic material) into a mold tool.

Plasticization of the material to be plasticized is effected by a supply of energy, by which the material to be plasticized is heated. So-called plasticizing screws are widely used for such applications. In that case the material to be plasticized is plasticized by a rotational movement of the plasticizing screw (by shearing and possibly with additional heating) and the plasticized material is expelled by an axial linear movement and introduced into a mold tool by way of an injection nozzle.

However, there are also other structural variants in which plasticized material is fed to an injection cylinder and the injection cylinder which is constructed like a piston-cylinder unit introduces the plasticized material into the mold tool by a linear movement.

After the plasticized material is fed into the mold tool the material solidifies in the mold tool and a finished product or a semi-finished product can be removed from the mold tool for further processing. Hardening of the plasticized material can take place by virtue of cooling or a chemical reaction.

The linear movement of the injection element involves increased forces which are usually produced by at least two linear drives. That movement and/or the force produced by the linear drives is passed to the injection element by way of a bearing element, in which respect deformation occurs in the bearing element by virtue of the force application moments and material factors.

A disadvantage in that respect is that upon deformation of the bearing element that deformation directly affects the linear drives. In the case of plate-shaped bearing elements the effect of the force generally results in flexural warping of the plate. The deformation of the bearing element has a further effect in the form of a bending moment on the linear drives, in which case the loading conditions on the linear drives also change by virtue of that bending moment thereon.

As the power of the linear drives is increased in the course of time the significance of stresses due to bending moments also increases.

SUMMARY OF THE INVENTION

The object of the invention is to reduce the stresses due to the bending moments reactive on the linear drives in comparison with the state of the art.

According to the invention:
the force can be transmitted by a transmission element from the at least two linear drives to the bearing element and thus to the injection element, and
at least one clearance is arranged between the bearing element and the transmission element that deformations of the bearing element are not transmitted to the transmission element or are transmitted to a reduced degree.

By virtue of the provision of that additional transmission element to which the at least two linear drives are fixed and which engages the bearing element, it is possible for the described deformation of the bearing element to be at least substantially decoupled from the at least two linear drives.

By virtue of clearances between the bearing element and the transmission element it is also possible to prevent possible wedging of those two components to or into each other.

The additional decoupling of the linear drives from the bearing element also makes it possible for the forces to be already better transmitted with a lower utilization of material and thus smaller structural sizes as the linear drives are no longer influenced by the deformation of the bearing element whereby the linear drives would suffer from a higher level of wear and would have to withstand a higher level of stressing.

In the context of the present document—when reference is made to a plate—this is not necessarily to be construed as a flat planar plate. It may also have recesses and raised portions. Configurations with ribs for stabilization purposes are also entirely conceivable.

The term shaping machines can be used in this respect to denote injection molding machines, injection presses, presses or the like.

The plasticized material can be for example a thermoplastic plastic.

The injection element can be rotationally mounted to the bearing element.

Preferably, the at least one clearance—preferably in a notional sectional view along the injection element—is arranged between a central axis of the injection element and at least one drive axis of at least one of the at least two linear drives.

The at least two linear drives can be connected to a common transmission element. Alternatively, various transmission elements can be provided (for example separate transmission elements per linear drive).

Preferably, between the bearing element and the transmission element is a connecting or contact surface which is preferably substantially rectangular. In that respect, the at least one clearance can preferably be arranged beside the connecting or contact surface.

At least one measuring diaphragm can be provided between at least one of the at least two linear drives and the transmission element. Such a measuring diaphragm makes it possible for example to measure the exerted pressure or tensile forces between the transmission element and the at least one of the at least two linear drives.

Preferably, the at least two linear drives are in the form of spindle drives, wherein preferably the spindle nuts of the spindle drives are connected in motion-connecting relationship to the transmission element.

The bearing element and/or the transmission element can have a central opening.

Preferably, a receiving member is provided for the injection element—substantially centrally—on the bearing element.

The term "central" arrangement for the purposes of the present document can mean that the corresponding element is arranged on a notional central axis of the injection element.

Preferably, the injection element is in the form of a plasticizing screw and/or an injection piston.

At least one rotational drive can be provided for producing a rotational movement of the plasticizing screw.

Preferably, the at least one rotational drive is arranged at the transmission element and/or the bearing element.

The injection element can be arranged in a mass cylinder.

Preferably, the injection element is fixed in linear motion-transmitting relationship to the bearing element and the mass cylinder is linearly moveably coupled to a fixing plate, wherein the bearing element is linearly displaceable with respect to the fixing plate by means of the at least two linear drives. This consequently means that the injection element is displaceable in the mass cylinder by way of a linear movement of the bearing element.

There are provided at least two drive motors for driving the at least two linear drives, which at least two drive motors are preferably in the form of electric motors—particularly preferably three-phase synchronous motors.

Preferably, the at least two drive motors are arranged at the fixing plate.

BRIEF DESCRIPTION OF THE DRAWINGS

Further details and advantages of the present invention will be described more fully hereinafter by the specific description with reference to the drawings in which.

DETAILED DESCRIPTION OF THE INVENTION

Figure 1:
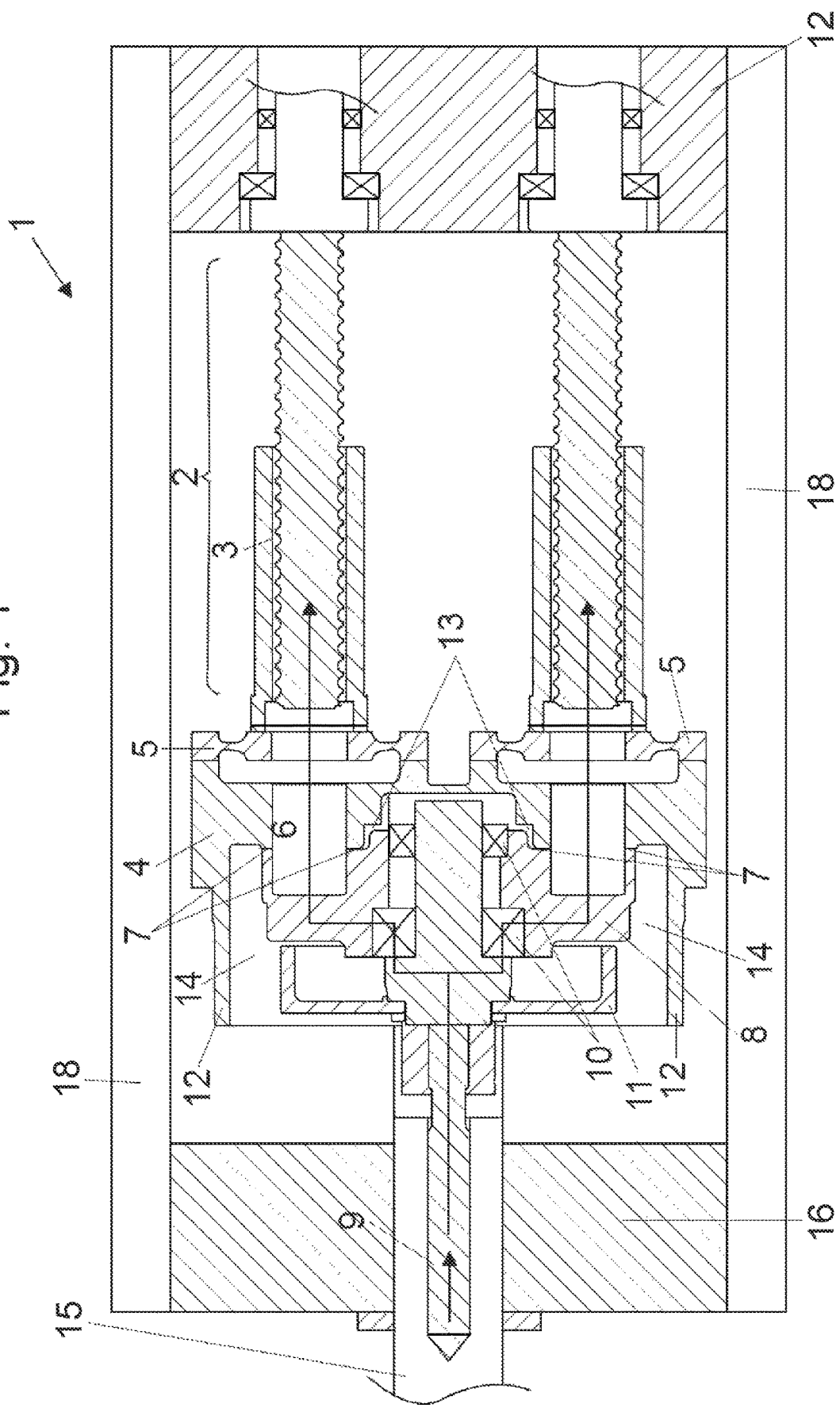
FIG. 1 shows a first embodiment according to the invention.

FIG. 1 shows an embodiment of an injection unit 1 according to the invention in cross-section, the injection unit 1 having two linear drives. In this embodiment the linear drives are in the form of spindle drives 2.

The spindle drives 2 are respectively connected to the transmission element 4 in motion-transmitting relationship by way of a spindle nut 3.

Arranged between the transmission element 4 and the spindle nut 3 are measuring diaphragms 5, by which it is possible to measuringly detect a force between the spindle drive 2 and the transmission element 4.

In addition the transmission element 4 has openings 6 which are adapted to receive the spindles of the spindle drives 2 in a retracted position—more precisely: a plasticizing position.

The transmission element 4 is connected to the bearing element 8 by way of the contact surfaces 7, in which case a force can be transmitted from the spindle drive 2 to the bearing element 8 by way of the transmission element 4.

The injection element which is in the form of a plasticizing screw 9 is fixed to the bearing element 8 rotationally and in linearly motion-transmitting relationship. To ensure the rotational degree of freedom of the plasticizing screw 9 it is connected to the bearing element 8 by way of the bearings 10.

The plasticizing screw 9 can be caused to rotate by way of the belt pulley 11, wherein the belt pulley 11 can be connected to a rotational motor by way of a belt. In this embodiment the belt drive is formed by a belt pulley 11 and a pinion connected by way of a belt (this is not shown for the sake of simplicity of the drawing).

It can be clearly seen from FIG. 1 that the spindle drives 2 shown here are connected together by the common transmission element 4. That transmission element 4 is also additionally braced by the bracing limb 12 to be able to manage the necessary forces.

The inner clearance 18 and the outer clearances 14 between the transmission element 4 and the bearing element 8 provide the necessary free space such that upon deformation of the bearing element 8 that is not passed on directly to the transmission element 4 and thus to the spindle nuts 2 fixed thereon.

In FIG. 1 the flow of forces from the plasticizing screw (more precisely: the tip of the plasticizing screw 9) towards the spindle drive 2 is identified by the arrows, whereby it is possible clearly to see how the force coming from the plasticizing screw 9 is diverted or divided up at the bearing element 8 and introduced into the spindle drives 2 by way of the transmission element 4.

The plasticizing screw 9 is arranged in a mass cylinder 15 fixed to a first fixing plate 16.

The spindle drives 2 connected to the transmission element 4 are supported at a second fixing plate 17. In that way the bearing element 8 (and the plasticizing screw 9 connected to the bearing element 8 in linear motion-transmitting relationship) is linearly displaceable by means of the two spindle drives 2 by way of the second fixing plate 17 with respect to the first fixing plate 16 (and the mass cylinder 15 which is coupled in linear motion-transmitting relationship to the first fixing plate 16).

The first fixing plate 16 is connected to the second fixing plate 17 by way of connecting plates 18. Design configurations are certainly also conceivable, in which the first fixing plate 16 and the second fixing plate 17 are alternatively or in addition to the connecting plates 18 connected by at least one bar member.

Figure 2:
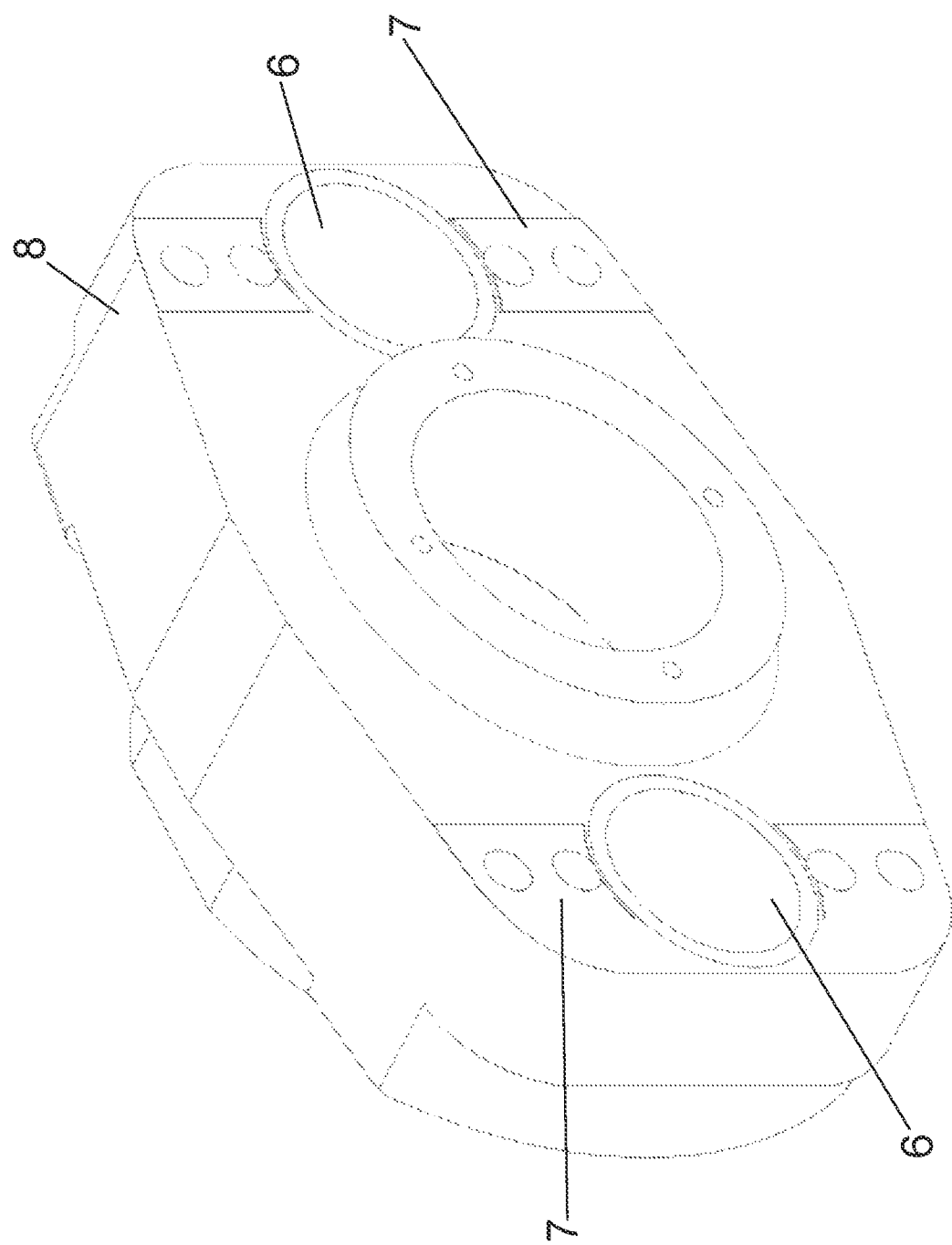
FIG. 2 is a perspective view of a bearing element.

FIG. 2 shows a perspective view of the bearing element 8, wherein provided centrally in the bearing element 8 is an opening for receiving the injection element—more precisely: the plasticizing screw 9. To the right and the left thereof there are openings 6 to receive the spindles of the spindle drive 2 in a plasticizing position.

The contact surfaces 7 arranged on the bearing element 8 are clearly visible in FIG. 2, against which the transmission element 4 bears (as already described with reference to FIG. 1), and whereby a certain degree of freedom between the bearing element 8 and the transmission element 4—more precisely the spindle drives 2 arranged at the transmission element 4—is provided so that not every deformation of the bearing element 8 or every deformation is applied to its full extent to the spindle drives.

LIST OF REFERENCES 1 injection unit
2 spindle drive
3 spindle nut
4 transmission element
5 measuring diaphragm
6 openings
7 contact surfaces
8 bearing element
9 plasticizing screw
10 bearing
11 belt pulley
12 bracing rib 13 inner clearance
14 outer clearance
15 mass cylinder
16 first fixing plate
17 second fixing plate
18 connecting plate

The invention claimed is:

1. An injection unit for a shaping machine, the injection unit comprising:
   an injection element suitable for introducing a plasticized material into a mold tool by a linear movement of the injection element,
   wherein:
   the injection element is coupled in linear motion-transmitting relationship to a bearing element and at least two linear drives are adapted to exert a force on the injection element by the bearing element;
   the force can be transmitted by a transmission element from the at least two linear drives to the bearing element and thus to the injection element; and
   at least one clearance is arranged between the bearing element and the transmission element such that deformations of the bearing element are not transmitted to the transmission element or are transmitted to a reduced degree.

2. The injection unit according to claim 1, wherein the injection element is rotatably mounted to the bearing element.

3. The injection unit according to claim 1, wherein the at least one clearance is arranged between a central axis of the injection element and at least one drive axis of at least one of the at least two linear drives.

4. The injection unit according to claim 1, wherein the transmission element is common to both of the at least two linear drives.

5. The injection unit according to claim 1, wherein a connecting or contact surface is provided between the bearing element and the transmission element.

6. The injection unit according to claim 5, wherein the at least one clearance is arranged beside the connecting or contact surface.

7. The injection unit according to claim 1, wherein at least one measuring diaphragm is provided between at least one of the at least two linear drives and the transmission element.

8. The injection unit according to claim 1, wherein the at least two linear drives are spindle drives.

9. The injection unit according to claim 1, wherein the bearing element and/or the transmission element have a central opening.

10. The injection unit according to claim 1, further comprising a receiver for the injection element provided on the bearing element.

11. The injection unit according to claim 1, wherein the injection element is a plasticizing screw and/or an injection piston.

12. The injection unit according to claim 11, further comprising at least one rotational drive configured to cause rotational movement of the plasticizing screw.

13. The injection unit according to claim 12, wherein the at least one rotational drive is arranged at the transmission element and/or at the bearing element.

14. The injection unit according to claim 1, wherein the injection element is arranged in a mass cylinder.

15. The injection unit according to claim 1, wherein:
   the injection element is fixed in linear motion-transmitting relationship to the bearing element and the mass cylinder is linearly moveably coupled to a fixing plate; and
   the bearing element is linearly displaceable with respect to the fixing plate by the at least two linear drives.

16. The injection unit according to claim 1, further comprising at least two drive motors for driving the at least two linear drives.

17. The injection unit according to claim 16, wherein the at least two drive motors are arranged on a fixing plate.

18. A shaping machine for production of shaped parts of plasticized material comprising the injection unit according to claim 1.

19. The injection unit according to claim 5, wherein the connecting or contact surface is rectangular.

20. The injection unit according to claim 8, wherein spindle nuts of the spindle drives are connected in motion-transmitting relationship to the transmission element.

21. The injection unit according to claim 10, wherein the receiver is provided centrally on the bearing element.

22. The injection unit according to claim 16, wherein the at least two drive motors are electric motors.

23. The injection unit according to claim 22, wherein the electric motors are three-phase synchronous motors.

* * * * *